United States Patent [19]

Meacham

[11] Patent Number: 4,740,073
[45] Date of Patent: Apr. 26, 1988

[54] SYSTEM FOR PROJECTING THREE-DIMENSIONAL IMAGES

[76] Inventor: G. B. Kirby Meacham, 3581 Traver Rd., Shaker Heights, Ohio 44122

[21] Appl. No.: 806,638

[22] Filed: Dec. 9, 1985

Related U.S. Application Data

[63] Continuation-in-part of Ser. No. 453,611, Dec. 27, 1982, abandoned.

[51] Int. Cl.⁴ ............................................. G03B 35/00
[52] U.S. Cl. ............................................ 352/58; 352/81
[58] Field of Search ....................... 352/43, 58, 61, 63, 352/81

[56] References Cited

U.S. PATENT DOCUMENTS

| 1,772,782 | 8/1930 | Noaillon | 352/63 |
| 2,198,678 | 4/1940 | Noaillon | 352/61 |
| 2,307,276 | 1/1943 | Keyzer | 352/58 |
| 2,401,173 | 5/1946 | Matthews | 352/63 |
| 3,046,330 | 7/1962 | Ross | 352/61 |
| 3,199,116 | 8/1965 | Ross | 352/58 |

FOREIGN PATENT DOCUMENTS 420955 12/1934 United Kingdom ................ 352/63

OTHER PUBLICATIONS

IBM Technical Disclosure Bulletin, vol. 8, No. 11, 4-1966, pp. 1578-1579.

Primary Examiner—Monroe H. Hayes
Attorney, Agent, or Firm—Robert T. Gammons

[57] ABSTRACT

A system of three-dimensional projection comprising in combination a screen and a viewer, said viewer embodying a mask containing see-through slits, means for projecting at least two different perspectives on the screen and means for effecting movement of the viewer to traverse the mask from left to right and from right to left such that from a given vantage point, each of the beholder's eyes sees a different perspective view, each of which is formed by the scanning motion of the screen at a rate such as to provide the illusion of an image continuous in both time and space.

7 Claims, 14 Drawing Sheets

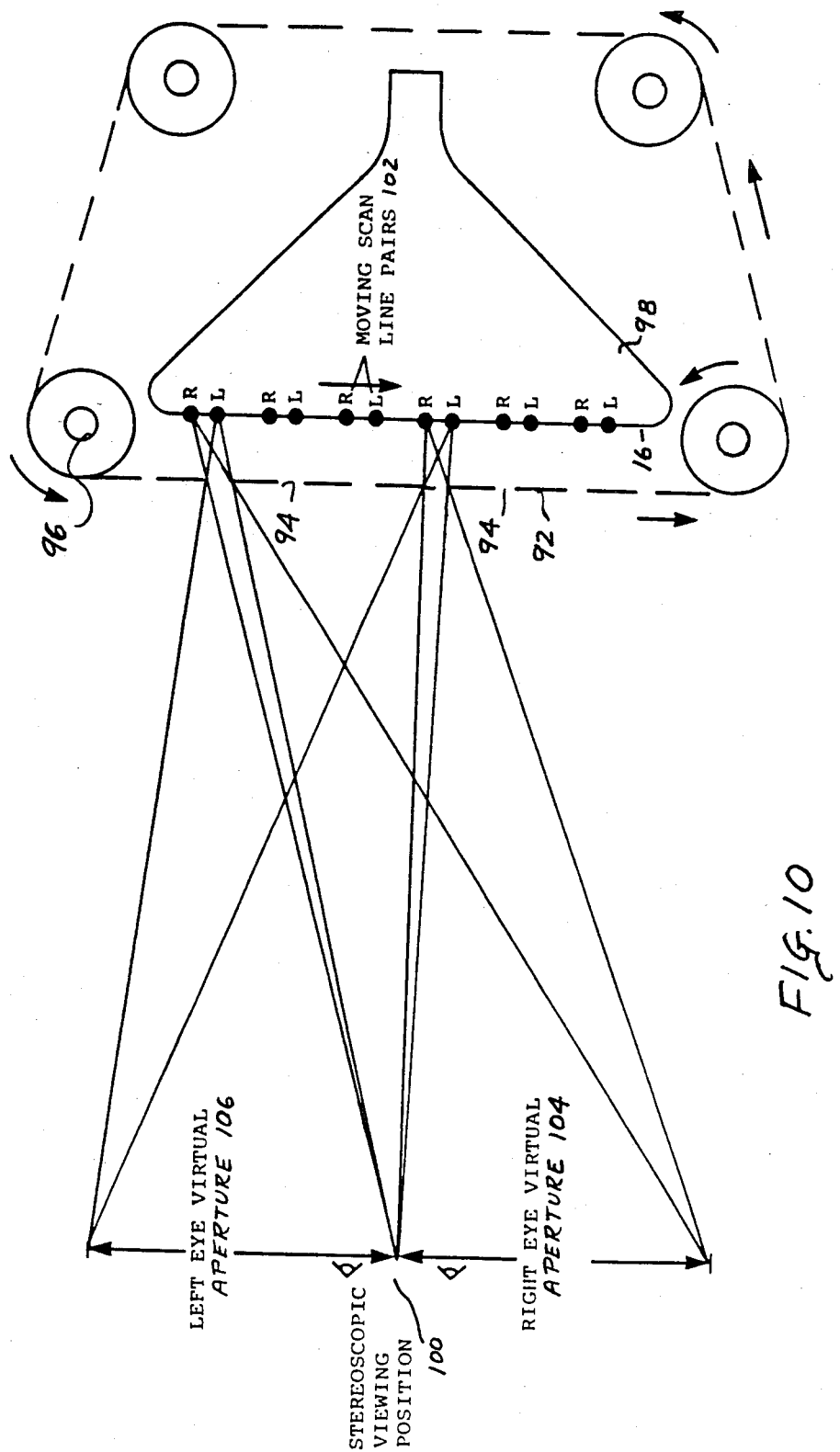

SYSTEM FOR PROJECTING THREE-DIMENSIONAL IMAGES

This is a continuation-in-part of Ser. No. 453,611, filed Dec. 27, 1982, now abandoned.

BACKGROUND OF THE INVENTION

Stereoscopic images have utility in a number of fields where accurate perception of the spatial relationship of various parts of the subject is important. Examples include interpretation of aerial photographs, visulaization of anatomical features in tomographic images, and operation of remote manipulators in hazardous areas or in outer space. Historically entertainment has also been an area of interest because of the increased visual impact three-dimensional images have compared to two-dimensional images.

Conventional stereoscopic systems require either that the observer peer into a set of eyepieces which present each eye with the appropriate member of a stereo pair, or that he wear a pair of spectacles or goggles which filter a double image on a screen so that each eye receives only one of the images. The inconvenience of these requirements has resulted in a number of attempts to present directly viewable three-dimensional images which can be observed with the same freedom as two-dimensional images. Development of such autostereoscopic systems has proven to be a difficult technical task. Holograms and lenticular screen hard copy approaches have had some success, but film projection and television approaches have not gotten much beyond the laboratory stage. In particular, most technically feasible prior art approaches have limitations such as double image zones, pseudoscopic image zones, very limited areas in which proper viewing is possible, and dark lines in the image field. Further, several systems intended to present autostereoscopic images have been proposed and patented which contain conceptual flaws which make them incapable of presenting a three-dimensional image.

The prior art concentrates on film based autostereoscopic displays, and provides little guidance on means of achieving this result using television. In particular, the scanning nature of television image formation, which is quite different from film image formation and presents a unique set of problems and opportunities, is not addressed.

The central features of this invention are improvements which eliminate the image flaws found in many of the prior art systems, a novel way of taking advantage of the scanning nature of television which results in a uniquely efficient and simple autostereoscopic display and a major improvement in individual viewing devices for large screen presentations.

SUMMARY OF THE INVENTION

This invention is in a general class of autostereoscopic displays in which a stationary or moving opaque mask with one or more vertically-oriented transparent slits is interposed between the observer and an imaging surface. The imaging surface may be a cathode ray tube face, a motion picture projection screen (front or rear projection), or any other suitable device which can form rapidly varying images. Because of parallax, the observer's lines of sight from each eye pass through the slits and intersect the imaging surface at different locations. If one set of image elements is formed on the imaging surface at points on the lines of sight of the left eye, and another set at points on the lines of sight of the right eye, each eye receives a different image. When the images received comprise a stereo pair, the observer has a three-dimensional impression of the scene. More than two sets of image elements may be presented simultaneously, with the result that the observer will perceive a perspective change with head movement in addition to the stereoscopic effect. Experiments by the inventor demonstrate that two views can present an excellent autostereoscopic view over a limited range of viewing positions, and that eight views provide a relatively wide range of positions and a convincing illusion of the perspective change experienced when viewing a physical object.

The invention and the prior art upon which it improves will now be described in greater detail with reference to the accompanying drawings, wherein:

FIG. 1 is a plan view illustrating the image stripes, viewing grid, and observer eye positions of the earliest type of prior art autostereoscopic system related to this invention;

FIG. 2 is a plan view illustrating the same system with the improvement of Keyzer U.S. Pat. No. 2,307,276;

Figure 8A:
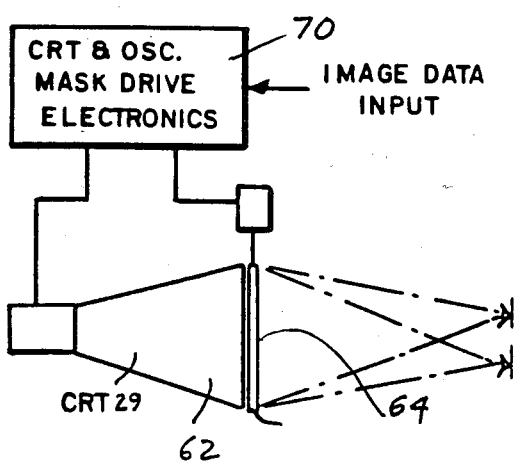
Figure 8B:
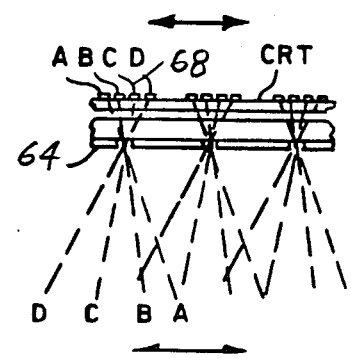
Figure 9A:
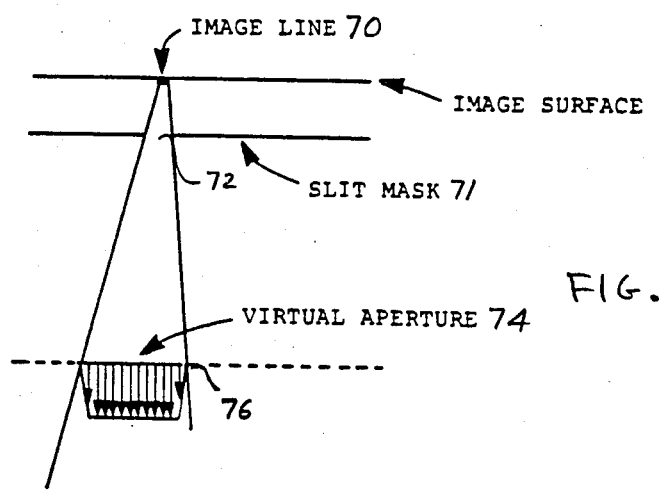
Figure 11:
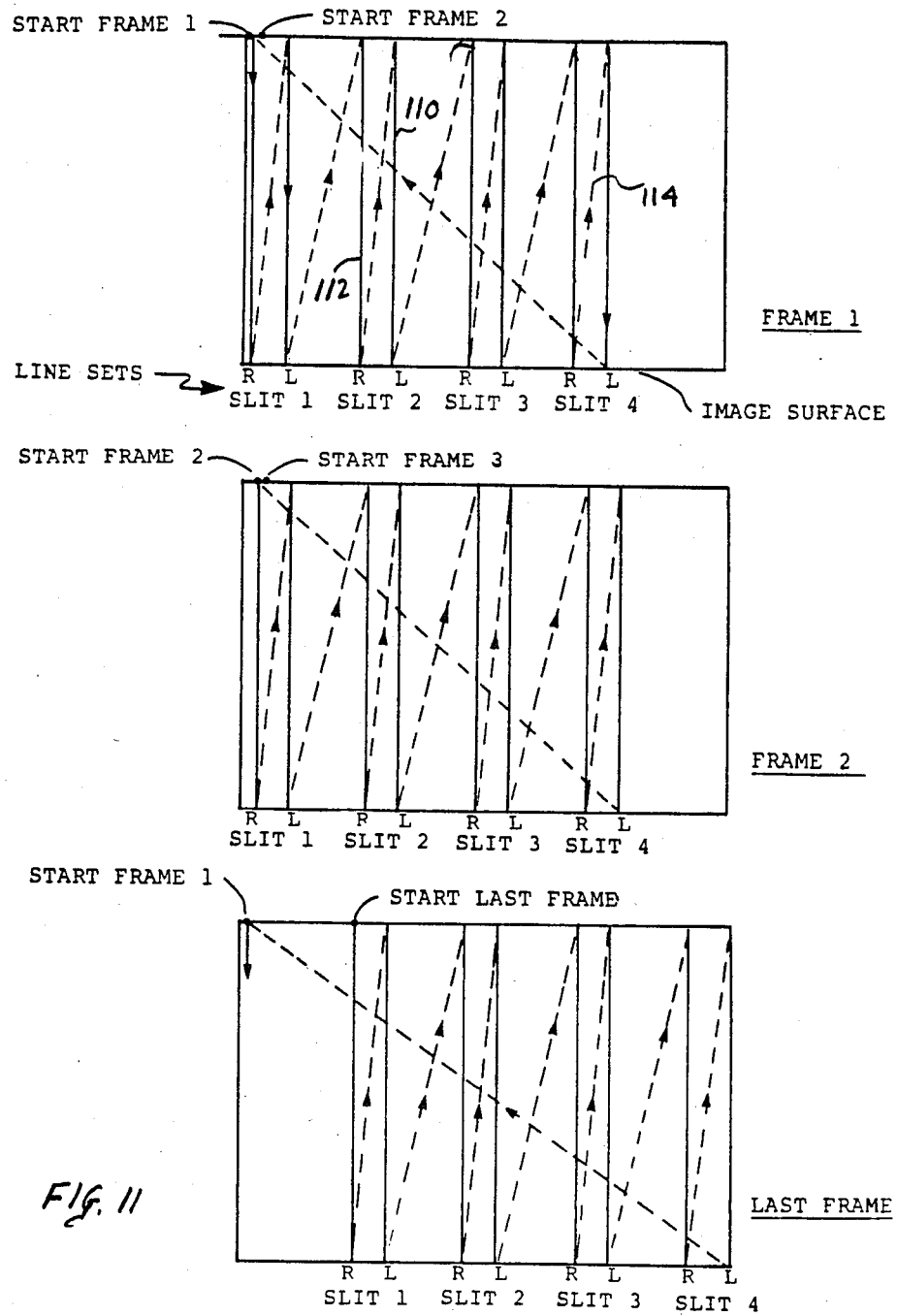
Figure 12:
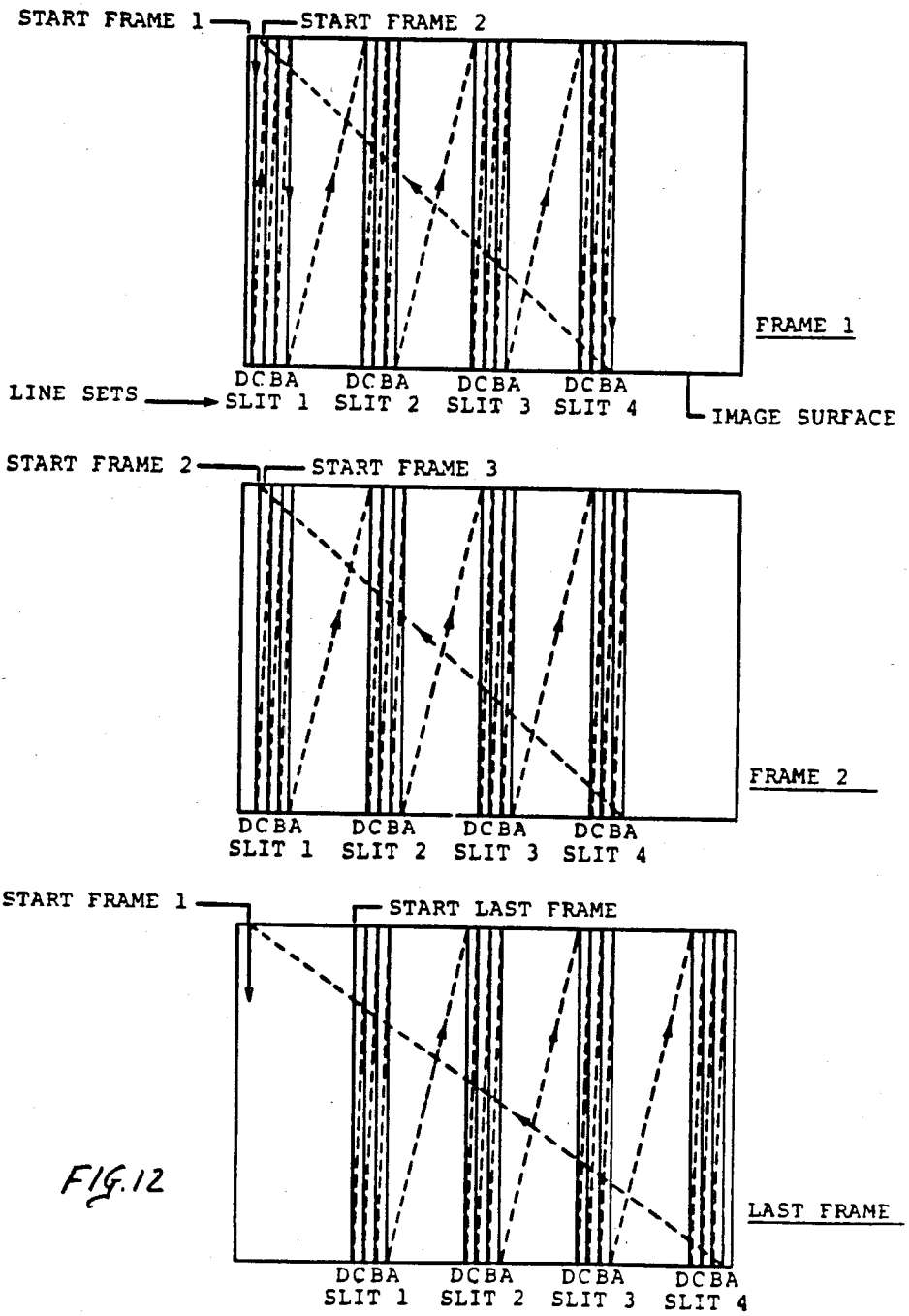
Figure 13:
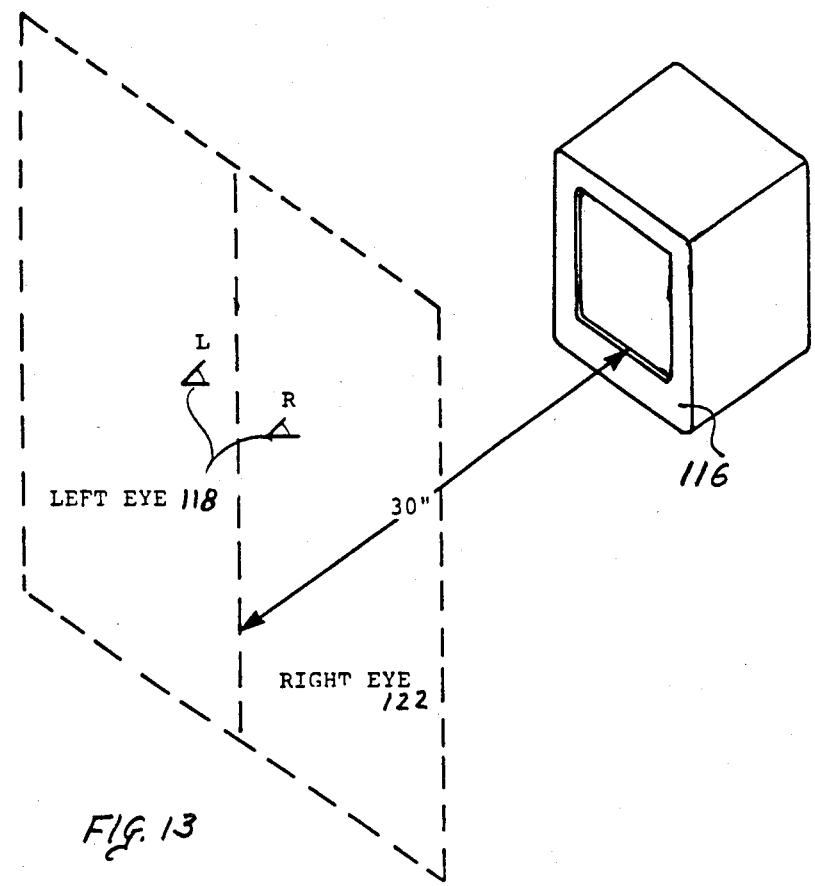
Figure 14:
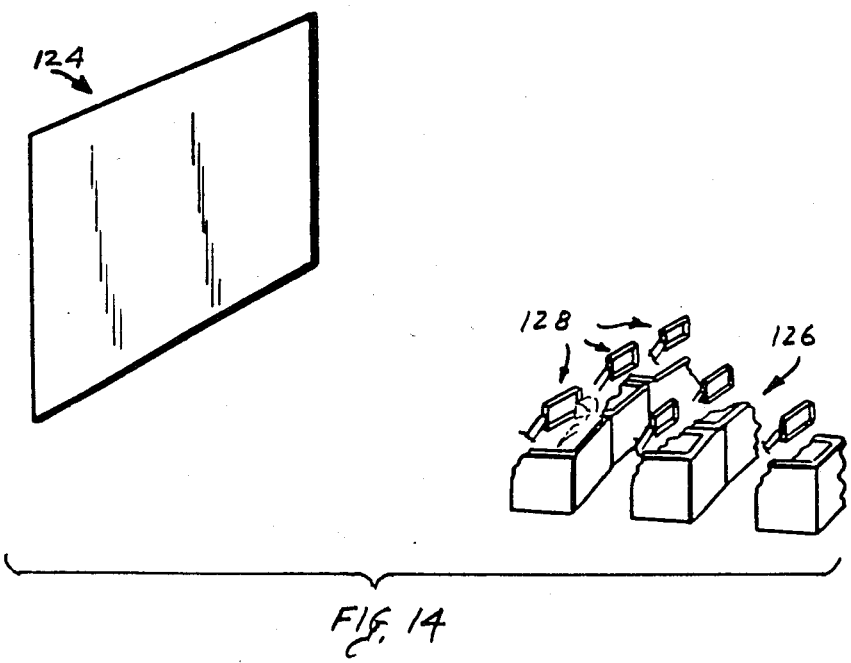
Figure 15:
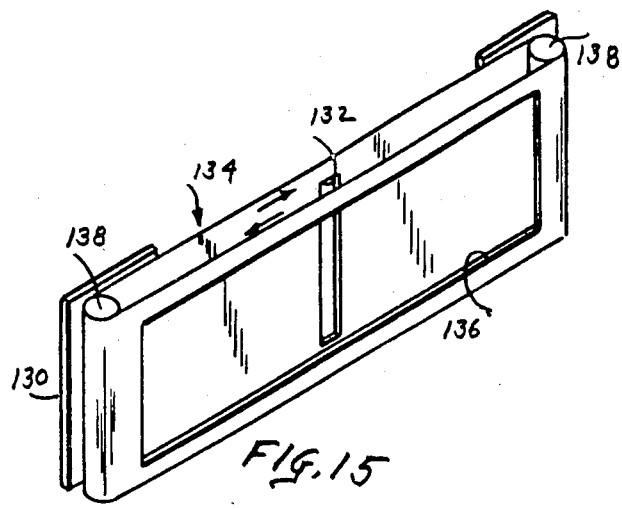

FIG. 8A diagrammatically illustrates a screen and cathode ray tube with means for oscillating the screen and tube electronics in consonance;

FIG. 8B is a fragmentary view illustration a portion of the cathode ray tube and slitted mask showing the image stripes on the cathode ray tube face;

FIGS. 9A, B and C illustrate the variation of the viewing zone brightness profile with changes in the image line to viewing grid slit width relationship;

FIG. 10 is a plan view of a two view television version of the invention using a continuously moving belt-like viewing grid;

FIG. 11 illustrates the scanning pattern used by the television system of FIG. 10;

FIG. 12 illustrates the scanning pattern used by a four view television system otherwise similar to that shown in FIG. 10;

FIG. 13 illustrates the overall arrangement of the system of FIG. 10;

FIG. 14 illustrates, respectively, an image surface (either television or projected film), rows of theatre seats facing the screen and viewing devices mounted so as to enable the theatre patron to look through the viewers toward the screen;

FIG. 15 shows the viewing device of FIG. 14 and its horizontally moving slit in perspective.

Figures 17A, 17B, 17C, 17D:
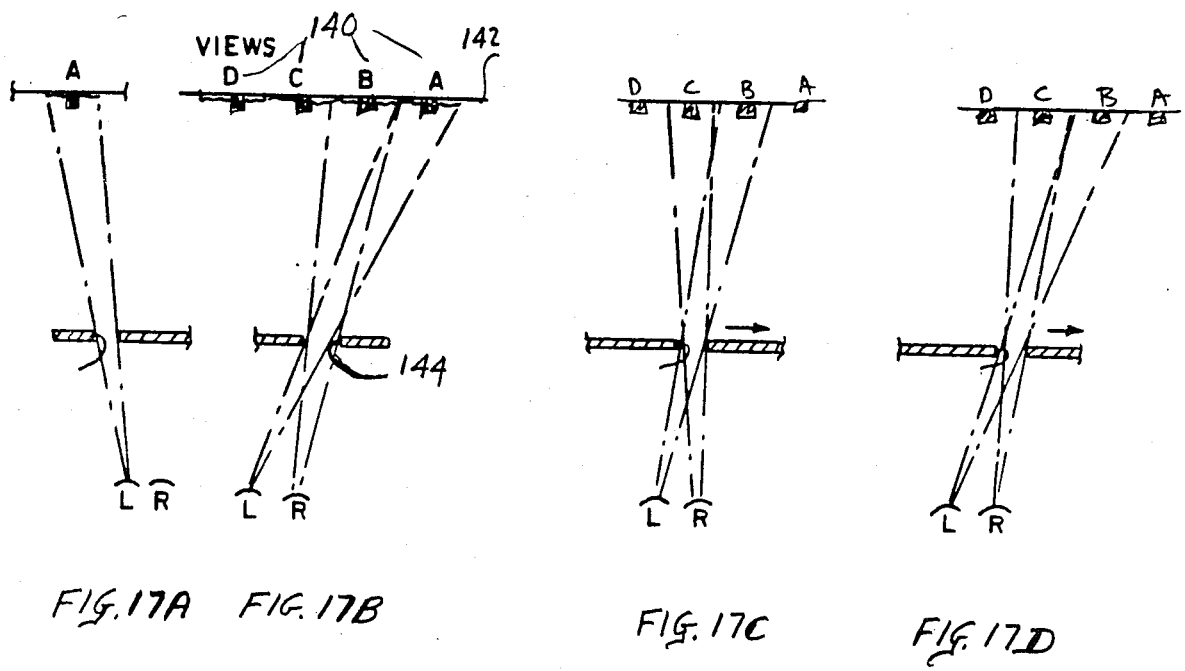
Figure 16A:
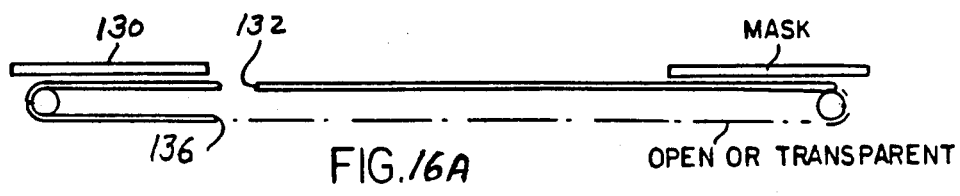
Figure 16B:
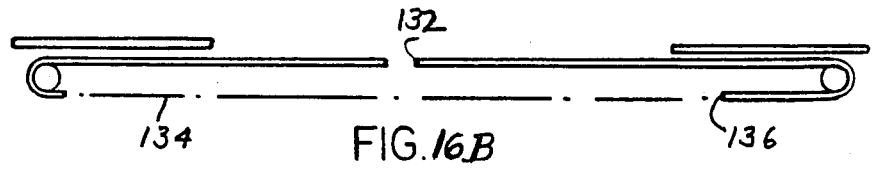
Figure 16C:
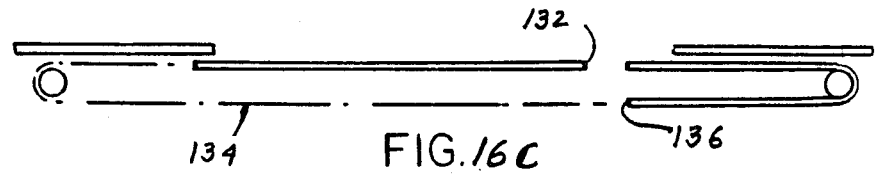
Figure 16D:
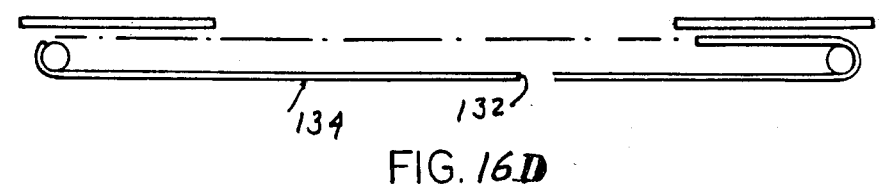

FIGS. 16A, B, C and D show the successive positions of the viewing device slit as the shutter travels transversely of the line of sight; and FIGS. 17A, B, C and D are plan views of the relationship of the observer to the moving slit viewing device and the moving image stripes on the screen.

Figure 1:
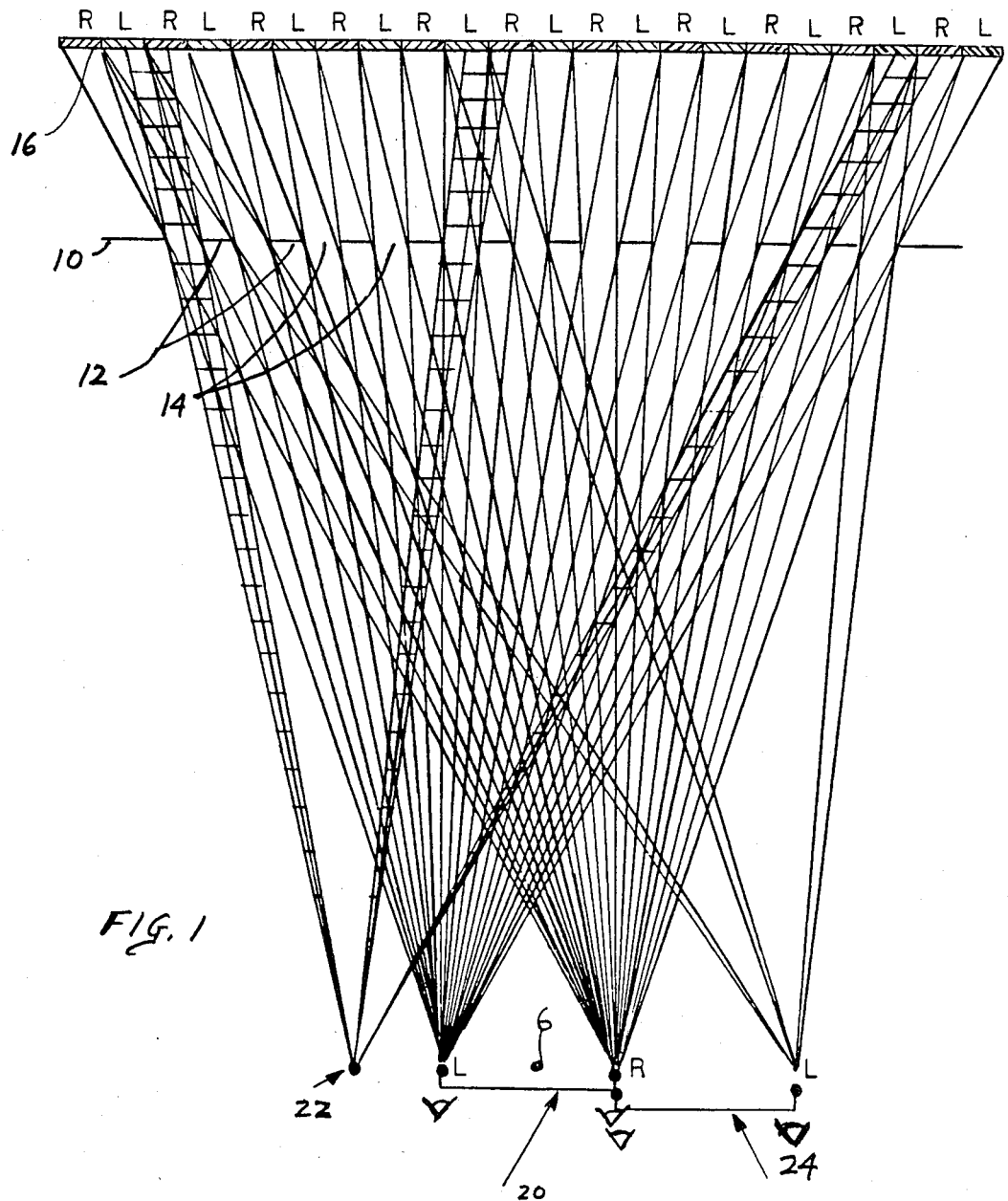

The basic concept upon which this invention and much of the prior art improves is shown in FIG. 1 wherein there is shown a grid 10 comprised of spaced, parallel, vertical, opaque bars 12 between which there are openings 14 of corresponding width. The grid 10 is positioned close to a projection screen 16 so that the spectators view the screen through the grid. Several means have been developed for projecting adjoining image stripes 18 on the screen such that the stripes are alternately composed of left and right eye images from a stero pair. When the image stripes and right eye images from a stero pair. When the image stripes and the grid are properly aligned, spectators at certain positions 20 in the theatre see only left eye stripes with their left eyes and right eye stripes with their right eyes. The result is a stereoscopic impression. This image, however, has two major flaws. First, the viewing zones are very limited—small movements put the observers into double image zones 22 where each eye sees a portion of both left and right image stripes. Further movements place the observers in pseudoscopic zones 24 where the right eye sees left eye image stripes and the left eye sees right eye stripes. These double and pseudoscopic zones destroy the stereoscopic effect and make viewing uncomfortable. The second problem is that the grid bars 12 are perceived as vertical black stripes in the image. Experiments by the inventor show that while dark bars do not destroy the stereo effect, they are intrusive. The majority of the prior art patents in the field deal with attempts to correct these flaws in the basic concept.

Figure 2:
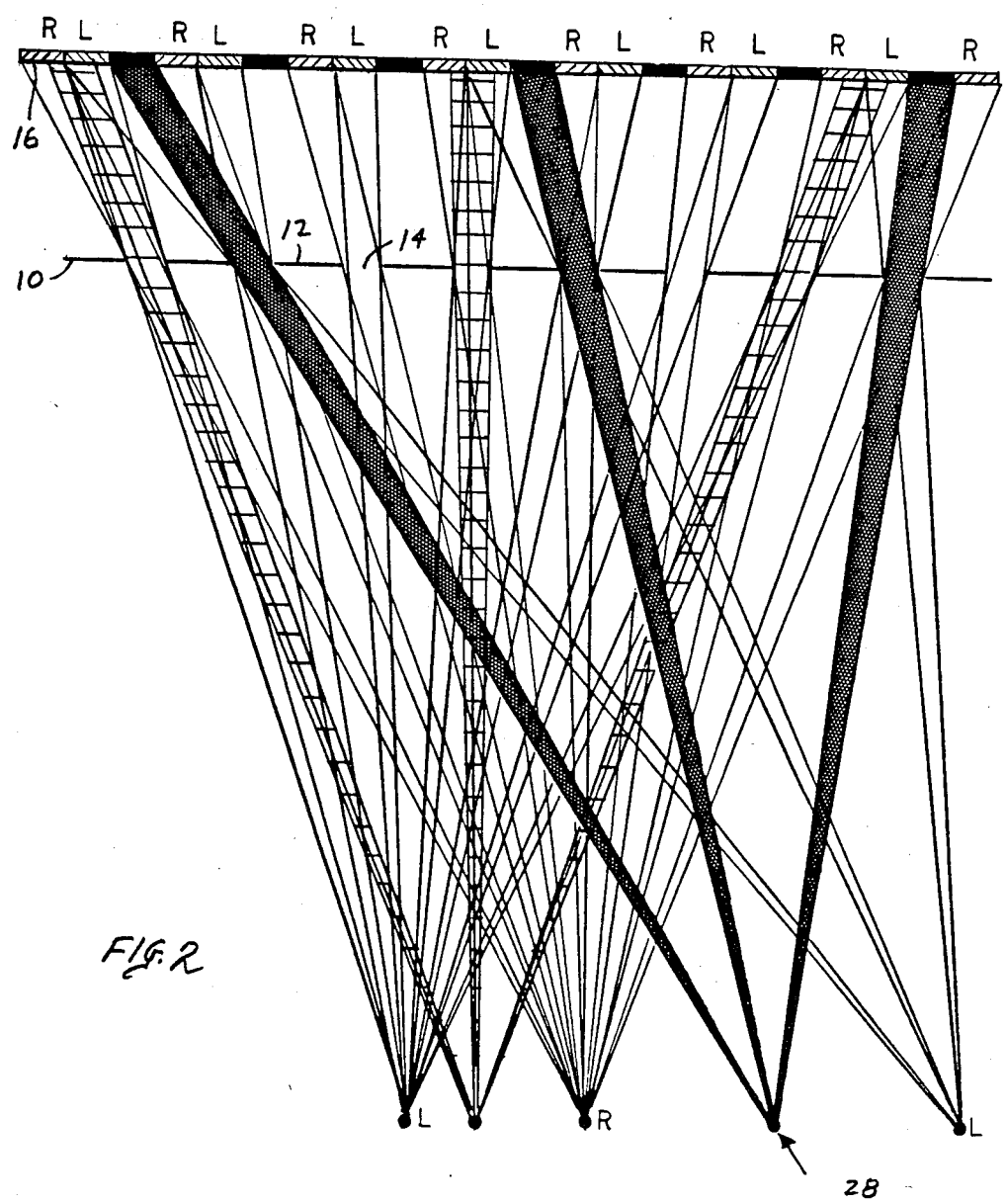

The visible grid bars 12 are the simpler problem and can be eliminated by moving the grid 10 rapidly enough to cause persistance of vision to create the illusion that the complete image is present at all times. It is important to note that the content of the image stripes 18 must change in synchronism with the moving grid 10 to paint the complete image over a period of time. One of the prior art reference which used the moving grid approach Noaillon (U.S. Pat. Nos. 1,172,782; 2,198,578; 3,196,456) utilizes the viewing grid as a stripe forming projection mask, thus assuring synchronism. Another, Savoye (U.S. Pat. No. 2,441,674) combines a projection mask into the same rotating conical structure as the viewing grid. Ross (U.S. Pat. No. 3,199,116) uses a moving grid, but is a different class of device and is discussed separately. The instant invention uses the persistence of vision effect as taught by Noaillon and Savoye to present complete images without visible vertical bars. Double and pseudoscopic image elimination is the more difficult problem and has resulted in only a few workable solutions. The multiple layer grid in the two later Noaillon references (U.S. Pat. No. 2,198,678; 3,196,456) has the function of eliminating double and pseudoscopic image zones by forming interocular barriers. Presumably, this is to correct problems encountered in the earlier Noaillon system (U.S. Pat. No. 1,772,782) which employs a single layer grid and appears to have pseudoscopic and double image zones. Savoye (U.S. Pat. No. 2,441,674) would seem to have very similar characteristics. The multiple layer grid in the later Noaillon reference limits its application to two views. The early Noaillon and the Savoye concepts in theory do not have this limitation because of their single layer grids, but the refernces only discuss two view systems. Keyzer (U.S. Pat. No. 2,307,276) eliminates pseudoscopic zones in both two-view and multiple view single layer grid stereoscopic systems by interposing dark bands 26 between sets of image stripes 18 as shown in FIG. 2. The effect is to replace the pseudoscopic zone 24 of FIG. 1 with a dark zone 28. This is an important improvement, but does not address the double image problem since the image stripes in a given set are adjacent and it is possible for portions of each stripe in a set to be seen simultaneously from a single eye position 30. Keyzer does not disclose grid motion to eliminate vertical black lines in the image.

Figure 3:
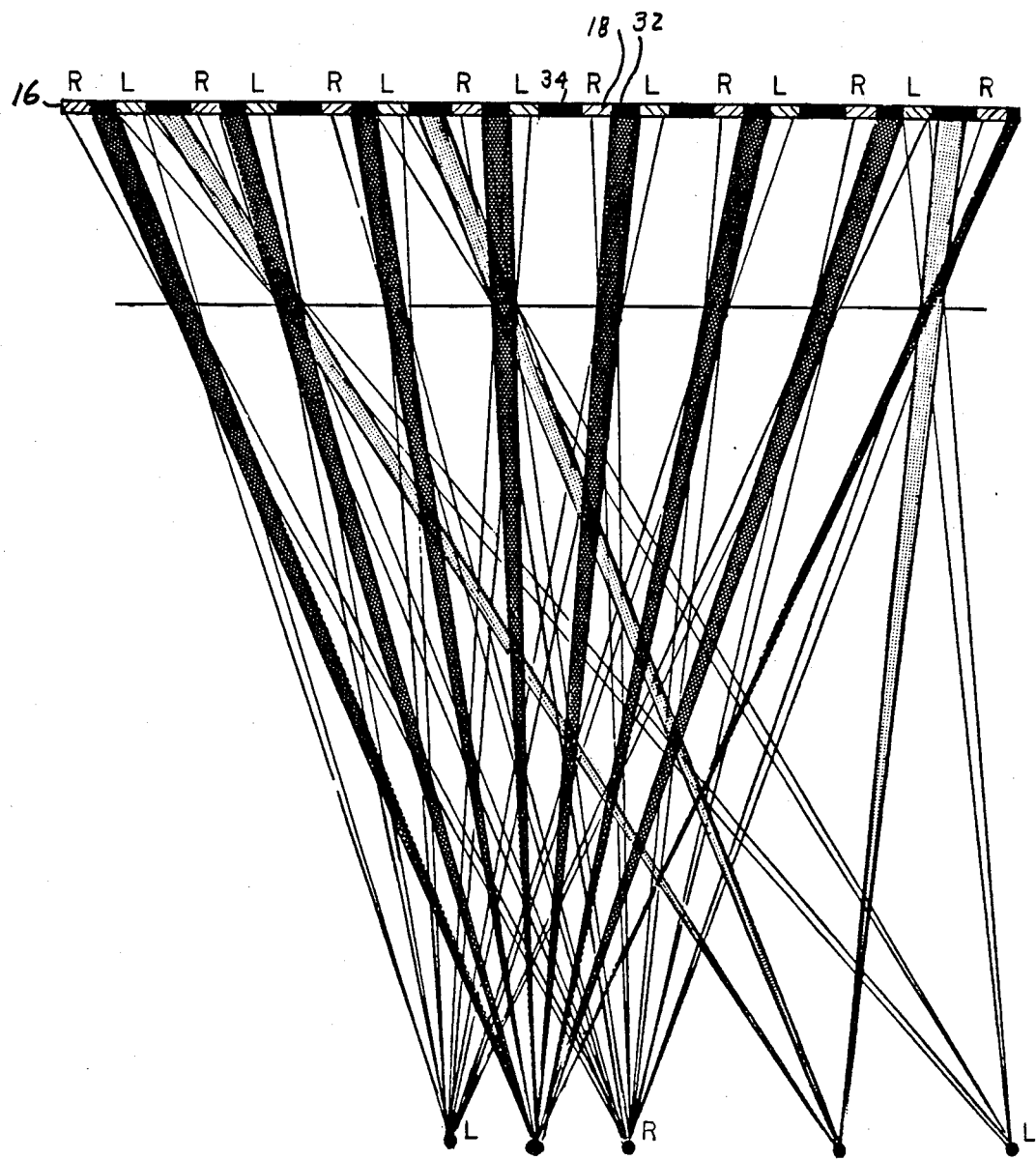
FIG. 3 is a plan view illustrating the image stripes, viewing grid, and viewer eye positions of this invention.

A principal aspect of the instant invention eliminates both pseudoscopic and double image zones by interposing small dark bands 32 between image stripes 18 within a set of stripes in addition to larger dark bands 34 between sets of stripes 18 as shown in FIG. 3. The small dark bands 32 assure that only one stripe 18 in a set can be seen at a time from a given eye position. If the small dark band 32 is approximately the same width as the grid opening 14, the double image zone is eliminated without creating a dark zone 38 in the viewing field. There is instead a boundary 36 between the left and right eye viewing zones. The larger dark bands 34 between sets of stripes create the dark zones 38 in the viewing field wider than the observer's interocular spacing. This assures that there are no pseudoscopic locations where the observer's right eye can see a left eye image simultaneously with the left eye seeing a right eye image stripe. As stated earlier, this invention preferably employs a moving grid to eliminate dark bands in the image.

The fact that a stereoscopic image can only be seen from a finite number of specific positions is inherent to autostereoscopic systems. The number, size and location of these positions is dependent upon the number of different views of the subject presented and the screen-grid geometry. Two-view systems, in particular, have very limited size viewing locations. Several of the cited references disclose unsuccessful attempts to overcome this inherent characteristic by use of scanning to provide a stereoscopic image to an observer at any arbitrary position in the field of view. The fallacy of these concepts is that an optical system which delivers a right-eye view to the observer's right eye at any arbitrary eye location will also deliver the same image to all the left eyes in the area, and vice versa. The result is double images at all viewing locations. Matthews (U.S. Pat. No. 2,401,173), Rosenbloom (U.S. Pat. No. 2,974,562), Dudley (British No. 481,879) and Chronostereoscopic (British No. 504,152) all have this basic defect.

Ross (U.S. Pat. No. 3,199,116) solved the black line, double image and pseudoscopic image problems, but in a manner very different than this invention or other cited prior art. A time sequence of images, each from a slightly different perspective, is flashed on a screen. A synchronized moving slit between the observer and the screen allows one of the observer's eyes to view an image on the screen and an instant later allows the other eye to view a second image. With the proper geometric relationships and changes in image perspective between successive images, the result is a stereoscopic image without double image or pseudoscopic zones. The key differences between Ross and the other systems including this invention are as follows. First, Ross presents wide image fields in time sequence, and the other systems present image stripes simultaneously. Second, a moving slit is essential to Ross—the system will not present a stereoscopic image without it. The other systems will provide a stereo effect with the grid stationary, and the movement serves only to eliminate dark lines. Third, the moving slit in Ross is a physical object in a plane equivalent to the lens plane of the camera which recorded the original image sequence. The other systems allow the physical grid to be at a position much closer to the screen and to form virtual apertures at the camera lens equivalent plane.

In summary, the instant invention applies the persistence of vision method taught by Noaillon and Bavoye for removing black lines to the Keyzer approach for eliminating pseudoscopic zones, and adds the key element of small dark bands 32 within an image line set to eliminate double image zones. This represents an important advance in the state of the art since it solves the last major problem affecting this class of autostereoscopic device and opens the way to a number of applications.

Figure 4:
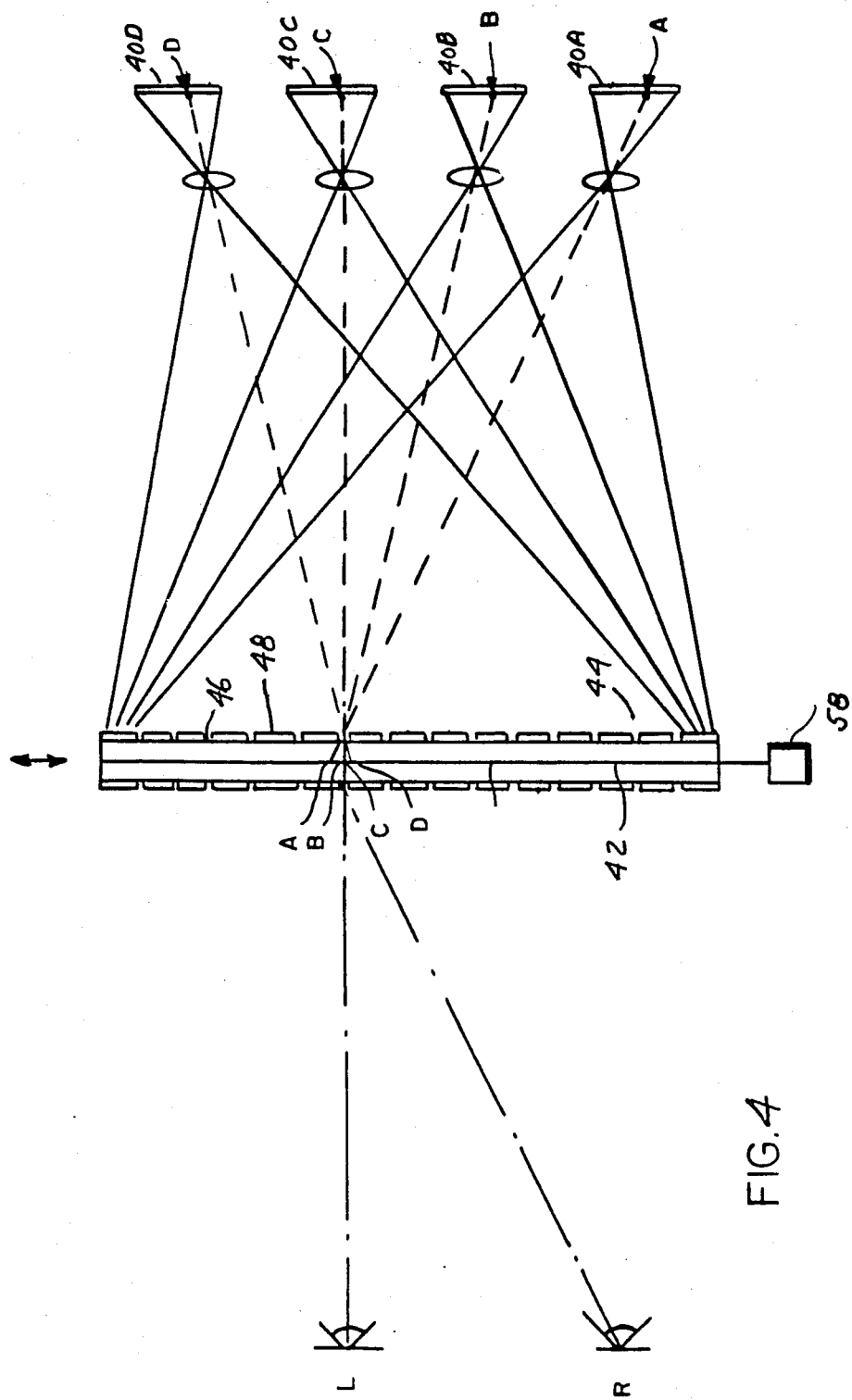
FIG. 4 shows a plan view of a version of the invention using projected film images, a shadow mask to create image stripes on a rear projection screen, a viewing grid on the observer's side, and means to oscillate the shadow mask and the viewing grid in unison.

FIG. 4 shows a plan view of a film image based autostereoscopic system which illustrates the application of the above-described principles. A number of projectors 40, in this example, four, 40a, 40b, 40c and 40d, are arranged to superimpose four real images A, B, C and D on the rear side of a translucent projection screen 42. The observer views the images from the side of the screen 42 opposite the projectors. A shadow mask 44 is positioned parallel to the screen 42 on the projector side. This mask 44 is made with a number of narrow, vertical, light-transmitting slits 46 between which there are opaque areas 48, and has the effect of forming image stripes A, B, C and D on the diffusion surface of the screen 42.

Figure 5:
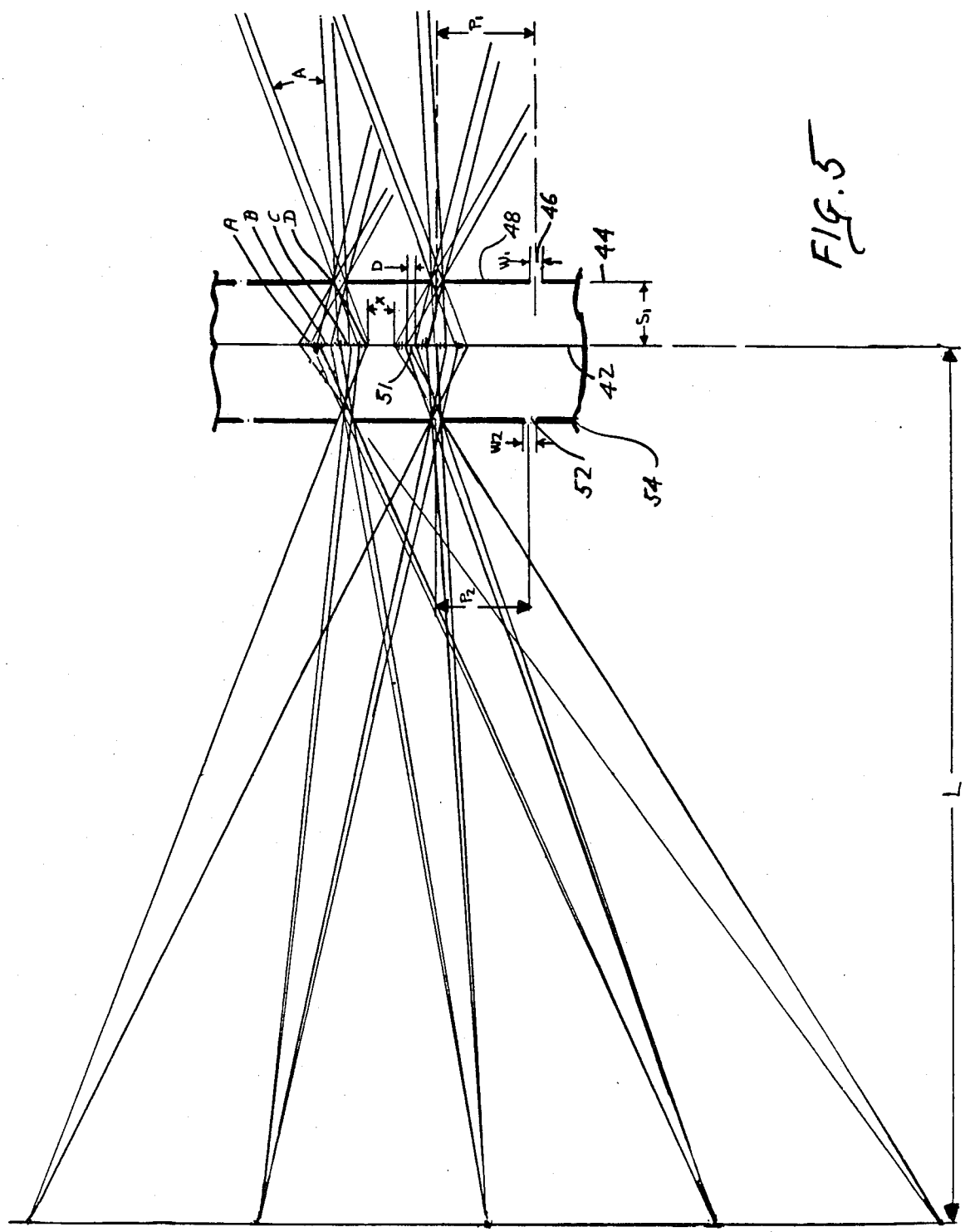
FIG. 5 shows in more detail the geometric relationship governing the system of FIG. 4.

The shadow mask 44 spacing from the screen diffusion surface of the screen 42, the width of the transparent slits 46, the spacing of the slits 46 and the positioning of the projectors 40 are adjusted, as shown in FIG. 5, to achieve specific relationships. The width of the slits 46, the angular separation of projectors 40 and the distance of the shadow mask 44 from the diffusion layer of the screen 42 are chosen such that the illuminated image stripes A, B, C and D on the diffusion layer of the screen have narrow dark bands 51 between them of a width D. The width D is chosen to be approximately the same width as the slits 52 in the viewing mask 54 to prevent a single eye from simultaneously observing a large enough area of two stripes through a slit to cause the perception of a double image. Experiment has shown that a small degree of double imaging is not, in fact, perceived as a double image, and may disguise transitions from one image to the next as the observer shifts his viewpoint. The distance P1 between shadow mask slit centers 46 is chosen to produce a dark band X between groups of four stripes of sufficient width that an observer cannot see "A" stripes with one eye and "D" stripes in adjacent groups with the other eye at the same time at a normal viewing distance. Maintaining this condition prevents perception of pseudoscopic images.

The viewing mask 54 which is positioned parallel to the screen 42 on the observer's side, is similar but not necessarily identical in dimensions and construction to the shadow mask 44. Its transparent slits 52 are in one to one correspondence with the shadow mask slits 46 and the two masks are oscillated in unison with an amplitude equal to at least one slit spacing and a frequency of 30 hertz or higher by the mechanism 58 shown schematically in FIG. 4. As discussed above, the width W2 of the transparent slits 52 in the viewing mask is chosen in relation to the width D of the dark bands A, B, C and D in order to optimize double image prevention and image to image transitions. The distance of the mask 54 from the image surface of the screen 42 and the distance P2 between slits 52 is selected so as to form a series of viewing zones or virtual apertures 59 in a plane X—X parallel to the screen 42. The distance L between the virtual aperture plane X—X and the screen 42 is typically a normal viewing distance on the order of two or three screen widths. Only one of the four projected views can be seen through each of the virtual apertures regardless of eye position. At the boundaries between virtual apertures, there is a narrow zone in which either no image or a double image is found. Careful design and adjustment can reduce these zones to the point that they are not noticed by an observer. The effect may be partially psychological and similar to the phenomenon that scan lines in television are not noticed when the observer's attention is on the image content.

Figure 6:
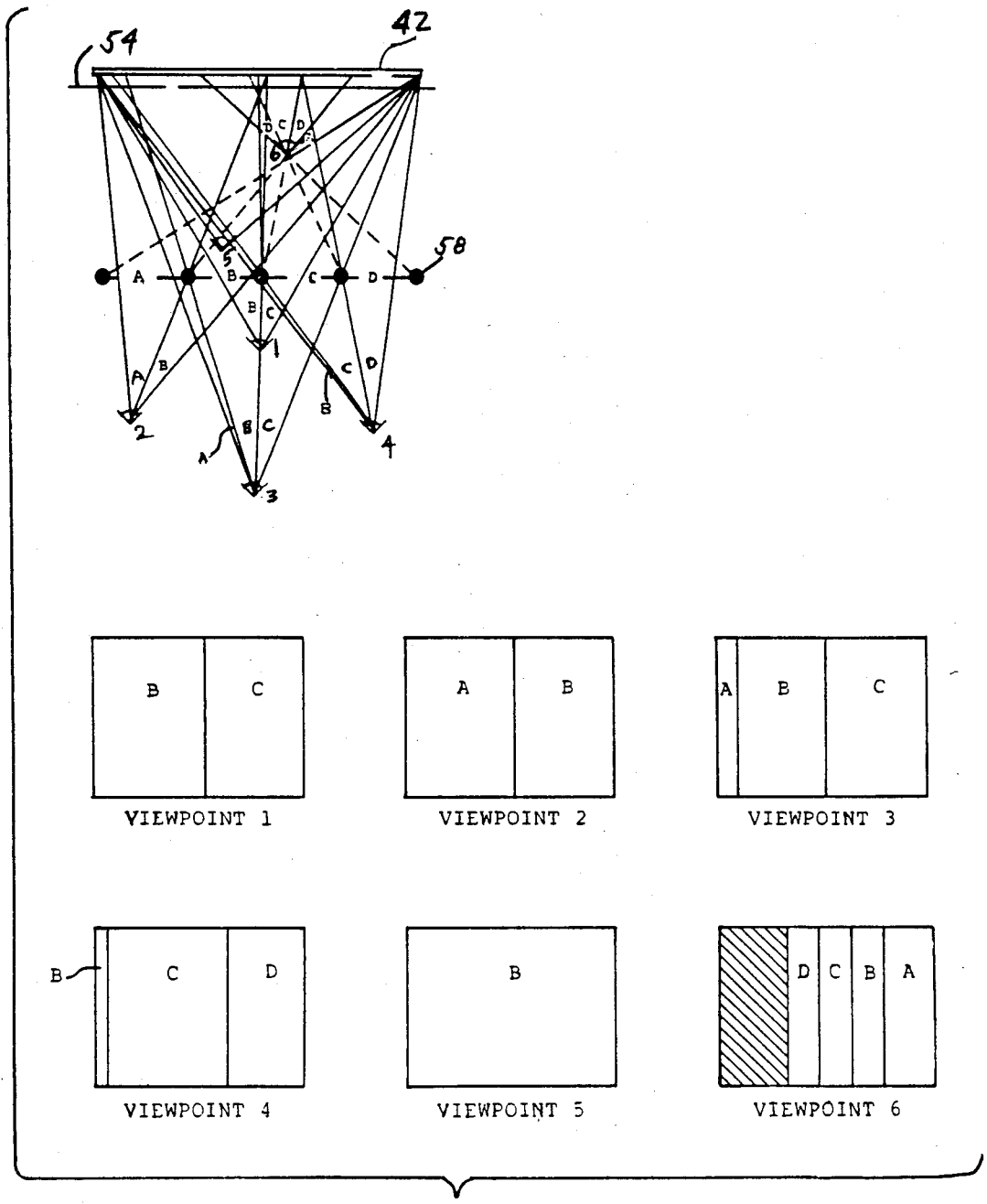
FIG. 6 shows the variation in the image perceived as a function of eye position with a multi-viewpoint implementation of the invention.

When there are just two images, as shown in FIG. 13, the observer must position himself such that his right eye 122 is in a right eye view virtual aperture 122 and his left eye 118 is in a left eye view virtual aperture 120 to perceive a stereoscopic impression. This limits lateral head motion to less than the observer's interocular spacing. As the number of different viewpoint images becomes larger, the stereoscopic viewing area increases, as does the variation in the appearance of the scene with changes in observer position. This is illustrated in FIG. 6 for a system with images from four different viewpoints. As the eye position varies left and right and towards and away from the screen 42 and viewing mask assembly 54, the screen is viewed through various sections of an array of virtual apertures 58. Typically, the image seen from a given vantage point is a composite of two or more of the input images. The pattern of variation of the composite image with vantage point is such that it mimics the change in appearance of the original object with changes in point of view. The effect holds true both in front of and behind the plane of the virtual apertures. This illusion of viewing an actual solid object is enhanced as the number of input views increases since the discontinuities between views become smaller and the range of permissible observer motion with accompanying perspective change increases. Experimental apparatus developed by the inventor which uses eight color slides as input images exhibits an illusion of depth similar to holograms, with the added features of full natural color, high resolution and no requirement for coherent light in image recording or viewing.

Figure 7:
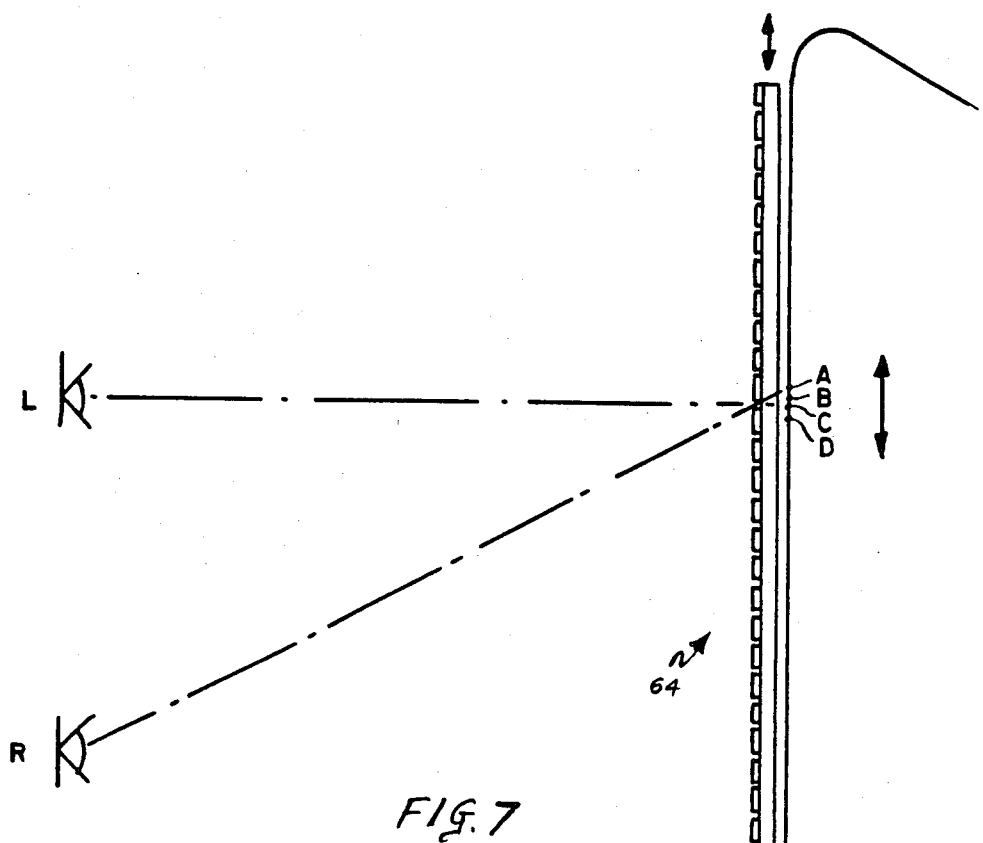
FIG. 7 shows a plan view of a television system analogous to the film system in FIG. 4 in which the projectors, shadow mask, and rear projection screen are replaced by a cathode ray tube which directly forms the required image stripes with vertical scan strokes.

FIG. 7 shows the invention implemented using a cathode ray tube 70 rather than projectors and a shadow mask to form the image stripes behind the viewing mask 72. In other respects, the system's structural elements are similar to the projected film image implementation described earlier. The viewing mask 72 is oscillated by the mechanism 74 and the image lines A, B, C and D are moved in unison to achieve the same general result as the film projection system. This coordinated movement is achieved by an electronic control unit 76, shown in FIG. 8A, which governs the action of the cathode ray tube 70 and the viewing mask 72. The means of generating the moving image lines in this television version of the concept is not, however, anticipated in the prior art and provides important functional advantages relative to the film version as well as to the prior art.

Figure 9B:
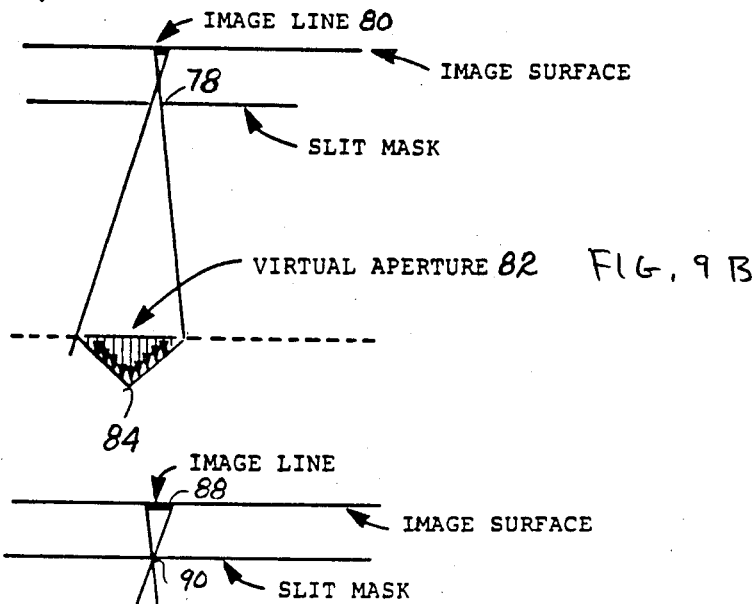
Figure 9C:
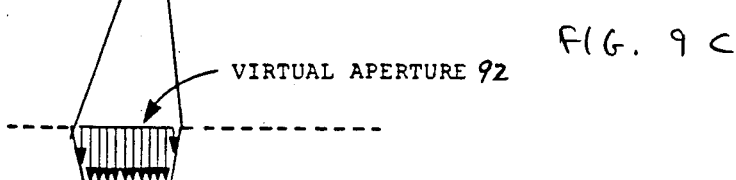

First, the image lines A, B, C and D, as shown in FIG. 8B, are each formed by a single vertical stroke of the CRT electron beam, and are, therefore, one picture element or pixel wide. For a given image resolution, this is the minimum possible line width, and in modern television displays is typically 1/500 to 1/2000 the total screen width. The advantage of narrow line width is illustrated in FIG. 9A. When a narrow line 71 is combined with a slit 72 in the mask 75 which is wide in comparison, the virtual aperture 77 through which the image is visible is uniformly illuminated from side to side and has sharp cutoff at the edges 79. These characteristics allow viewing zones to be placed adjacent to each other without double image zones or dim zones. When the slit 81 and image lines 83 are of comparable width, FIG. 9B, the light intensity of the virtual apertures 85 varies uniformly from a peak 87 in the center to zero at the edges 91. This situation is typical of projected film images, and requires careful balancing of double image effects versus dim zones at the border between adjacent virtual apertures. Narrow image lines with projected film images are impractical because of the large light loss caused by the narrow shadow mask slits required to form the narrow lines. The combination of a wide image line 93 with a narrow viewing slit 95, FIG. 9C, results in a virtual aperture 97 similar to the one formed by a narrow line and wide slit in that it has uniform illumination and sharp edge cutoff. The narrow viewing slit 95, however, results in large light losses.

Luminous efficiency is a second major advantage of this television-based system. When each image line 71 in FIG. 9a is a single vertical television scan line, there is virtually no light loss in the system since the observer looking through the virtual aperture 77 directly views the rapidly moving scanning spot. This flying spot "paints" the image on the observer's retina exactly as if the mask 75 were not there. The mask 75 serves simply to limit the range of eye positions in which the observer is able to see the image. The physiological and optical processes by which the flying spot image scanning is able to create the impression of a realistic image are the same as are utilized by conventional television.

In summary, the exploitation of the flying spot nature of television in this invention allows a combination of luminous efficiency and optimum virtual aperture characteristics not otherwise obtainable. In the following paragraphs, examples of practical television implementations of the invention are described.

FIG. 10 is a plan view of a two-view television-based autostereoscopic display. An endless belt 92 containing slits 94 entrained about four sets of sprockets 96 is caused to travel across the face of a cathode ray tube 98 with unidirectional motion and return around the rear of the cathode ray tube. At any instant, a number of the moving slits 94 are positioned between the observer 100 and the tube face. A motor operated by a servo control system of known design (not shown) drives the sprockets 96 so that the slits 94 in the belt 92 move in predetermined relation to the moving image scan lines 94. At all instants, the relation of the scan lines 102 to the slits 94 is such that only right eye view scan lines 102 may be seen in the area of the right eye virtual aperture 104 and only left eye view scan lines 102 may be seen in the area of the left eye virtual aperture 106. The observer 100 positions himself with his left eye looking through the left eye virtual aperture and his right eye looking through the right eye virtual aperture, and receives a stereoscopic impression assuming that the two images are correctly related members of a stereo pair.

The type of video scan pattern used in the system of FIG. 10 is shown in FIG. 11. Each complete image, which is repeated typically 30 to 60 times a second, is composed of a sequence of frames. A frame consists of one left and one right view image scan line 110, 112 for each slit between the observer and the tube face. Each frame is incremented one scan line width to the right of the preceding frame so that by the time the last frame is complete, the images, one of each member of a stereo pair, have been displayed. At this point, the slit has advanced one slit spacing and the process starts over. Blank retraces 114 in which the aim point of the cathode ray tube electron beam is moved without beam current are used to position the beam for the start of each image forming stroke. The net effect of this pattern is to "animate" a pair of image lines behind each moving slit so that the image lines follow the slits across the tube face and in aggregate form both members of a stereo pair.

The two view systems of FIGS. 10 and 11 is used to illustrate a practical system both because of its simplicity and because a two-view system for aerial photo analysis is expected to be an early application of the invention. Additional views are added in a very straightforward way by increasing the number of image lines associated with each slit. FIG. 12 shows the scan pattern for a four-view system which is analogous to the two-view pattern of FIG. 11.

The overall appearance and useful viewing zones of the two-view system of FIGS. 10 and 11 is shown in FIG. 13. In appearance, the display 116 resembles a typical video work station and observers outside the central viewing position 119 perceive a two-dimensional view through the left or right virtual apertures 120 and 122. An observer at the central position 119 perceives a stereoscopic image.

The systems described up to this point have consisted of a projection screen or other imaging surface and a closely associated viewing mask which serves all the observers in the viewing area. As discussed earlier, not all locations are good viewing positions because of dark zones in the viewing field. This is particularly likely to be a problem in displaying images to a group of people in a theatrical setting on a large screen. While it is possible in principle to use a large number of views of the subject so that the area of acceptable viewing covers the entire audience, a more practical approach may be to project a smaller number of views on the large screen and provide each member of the audience with a viewing device or "window". The overall arrangement of such a system is shown in FIG. 14. A screen or other image forming surface 124 is placed in view of the audience which occupies a group of seats 126. The audience members observe the image surface through the viewing devices 128 which are mounted in a convenient position a foot or two away from their faces. As will be described in more detail, the observer perceives a three-dimensional image independent of his location within the general viewing area.

The viewing device, FIG. 15, consists of a frame and a support (not shown) for an endless opaque curtain 134 containing a vertical, transparent slit 132 and a window 136 to allow a viewing passage through the slit 132. The curtain is mounted on transversely-spaced, parallel rollers 138. Also included, but not shown, is a motor and control system which drives the rollers 138 and curtain at a controlled velocity and phase relationship. FIGS. 17A, B, C and D show the successive positions of the slit 132 as it is driven by the rollers across the opening of the viewing device. The net effect is a transparent slit in an opaque barrier which moves from left to right across the barrier. As the slit returns for the next cycle, it creates a right to left moving opening. This action is not needed by the system and takes place while the image screen is darkened between successive images so that it is not apparent to the audience members.

The operation of this variation of the invention is illustrated in FIG. 17A, B, C and D. A single set of image lines 140 is swept across the image surface 142 forming the required multiple perspective views. The velocity and phase of the moving slit 144 are controlled so that for a given eye position, only one moving image line 140 is visible as it crosses the image surface 142 and generates a complete image. The observer's interocular spacing causes each eye to be positioned such that it perceives a different view, and the parallax disparity between the views results in a stereoscopic impression. The key features of this viewing device are that a single vertical slit 132 traverses the viewing field in a continuous motion and that the optical arrangement allows the device to be a substantial distance, such as one to two feet, away from the viewer's face. In contrast, the prior art references such as Thege (British No. 4,209,950), Stobie (British No. 247,239), Franklin (French No. 941,661) and Relief Lyon France (French No. 934,747) describe viewing devices which must be held close to the face like binoculars and can only be used for two-view systems. Despite the apparent similarity of the single slit viewing stations to the prior art devices, the operating principles are different and the functional advantages of large eye relief and capacity for more than two views, with consequent freedom of head movement, are significant.

It should be pointed out that the mechanical moving slit mechanism described here is intended to illustrate the principle and is not the only means of creating the optical effect of a transversely-moving, transparent moving slit. Recent developments in electrically-switchable liquid crystals, for example, promise an equivalent device without moving parts.

In the claims, the following terminology and definitions are used:

"Imaging surface" may be a front or rear projection screen, a cathode ray tube face, the locus of a moving linear array of light-emitting devices, or any other means of presenting an image on a surface. The surface is not necessarily planar.

"Moving slits" include a physical moving slit aperture in a sheet of any opaque material or any mechanical, optical or electro-optic equivalent. Motion may be unidirectional or oscillatory, and is fast enough that persistence of vision creates the illusion that all areas of the image are continually present.

"Image stripes" are vertical illuminated bands on the imaging surface which move in cooperation with the moving slits. The combination of image stripes and the moving slits limits the viewing zones of the image formed by a given image stripe to specific locations in the viewing field. The stripes may be formed on the imaging surface by known means.

"Image stripe groups" are sets of image stripes, each of which forms a different image. There may be two or more stripes in a group and one or more groups forming a complete image field.

"Image field" is the total extent of the picture as perceived by an observer. It may be formed as a unit by a single slit and image stripe group or made up as a mosaic of vertical sections, each section formed simultaneously by a number of slit and associated image stripe groups.

"Viewing zone" is a virtual aperture or area in space through which a particular view of the image may be observed. If the observer places his left eye in a left viewpoint image zone and right eye in a right viewpoint image zone, he perceives the image stereoscopically. Sets of adjoining viewing zones may exist in the viewing area, each zone accessing an image sterooscopically related to those in adjoining zones in the set.

"Viewing area" is the general area in which the image may be observed through viewing zones. It may range from space for one observer to theatre size.

"Cathode ray tubes" may be the familiar devices used in television or any other equivalent device which forms an image surface by successively forming image lines one pixel wide. Projection television, laser scanning projection, and some forms of flat panel displays are examples.

It should be understood that the present disclosure is for the purpose of illustration only and includes all modifications or improvements which fall within the scope of the appended claims.

What is claimed is:

1. An improvement in autostereoscopic image display comprising forming vertically-oriented image stripes on an imaging surface in groups, each group consisting of two or more stripes, each stripe being a portion of two or more images from different perspectives, arranged so that the leftmost stripe in the group is from the image with the rightmost point of view, the next to leftmost stripe is from the image with the next to rightmost point of view and proceeding in this order to the rightmost stripe in the group which is from the image with the leftmost point of view, placing an opaque mask with vertically-oriented slits between the imaging surface and the observer with the slits so positioned that the left eye is limited to viewing one stripe in each group and the right eye is limited to viewing a different stripe in each group with image content from a more rightward perspective than the stripe the left eye is viewing such as to provide a stereoscopic impression, said improvement comprising interposing dark zones between image stripes in each group, the dark zones having a width approximately equal to the projected width of the slits from the observer's vantage point, with the result that the observer cannot view any two adjacent image stripes simultaneously from a single view position and, consequently, perceive an unwanted double image.

2. A system according to claim 1 in which the dark zones between groups of image stripes are wide enough so that the observer's left eye cannot see a right eye view at the same time that his left eye can see a left eye view, thus preventing an unwanted pseudoscopic impression.

3. A system according to claim 1 comprising effecting horizontal movement of the image stripes and slitted mask such that as each stripe sweeps an area of the image plane, a complete image is formed, coordinating the motion of the mask with the image line motion so that each image line is viewable by the appropriate eye of the observer throughout the motion, effecting such motion at a rate such that each area of the imaging surface is scanned repeatedly at a frequency such that the observer's persistence of vision provides an illusion of images constant in time and continuous in extent to present to each eye of the observer a complete but different view of the subject, these views being members of a stereo pair.

4. A system according to claim 1 comprising forming the image stripes with a plurality of projectors separated in a horizontal direction and focussed on the imaging surface, preferably a translucent diffusion screen, interposing an opaque mask between the projectors and the imaging surface containing vertical slit openings substantially similar in spacing and number to those in the viewing mask so positioned that the required dark zones are formed between image stripes and moving the shadow mask in consonance with the viewing mask to present the desired views to the observer.

5. A system according to claim 1 comprising forming the image stripes on an imaging surface consisting of the front face of a cathode ray tube by vertical strokes of the electron beam, these strokes being one pixel wide, sequencing the strokes in a horizontal direction such that the overall effect is one or more groups of vertical image lines moving in a horizontal direction and controlling said motion so as to be in consonance with the motion of the slitted mask to present the required views to the observer.

6. A system according to claim 1 comprising forming on an imaging surface a single horizontally-moving, vertically-oriented image stripe group, providing one or more viewing devices, each containing a single vertically-oriented, horizontally-moving transparent slit positioned relative to the imaging surface and the observer such that each observer views the stripes on the imaging surface through the slit in his individual viewing device, the motion of the slits being such that the observer receives a stereoscopic impression.

7. In an autostereoscopic display of the class which uses a pattern of vertically-oriented, horizontally-moving image stripes, separated by dark zones, electron beam control means for generating said stripes on the face of a cathode ray tube such that the stripes are one pixel wide, each formed by a succession of single vertical television scan lines, said stripes on the cathode ray tube face being formed in a short interval of time such as to generate a sub frame, each subframe being followed by a subsequent subframe and each subframe differing from its immediate predecessor not only in that it is indexed one pixel in the horizontal direction, but that the image content of each stripe changes, the change being such that each stripe over time forms a complete section of the image, the overall effect being the formation of a pattern of image stripes separated by dark areas which moves across the cathode ray tube face at the rate of one pixel step per subframe.

* * * * *